US006759820B2

(12) United States Patent
Karwath

(10) Patent No.: US 6,759,820 B2
(45) Date of Patent: Jul. 6, 2004

(54) ARRANGEMENT FOR SUPPLYING A USER, ESPECIALLY A D.C MOTOR, THAT CONSUMES POWER IN A NON-CONTINUOUS MANNER FROM A D.C. SYSTEM

(75) Inventor: Arno Karwath, Rottweil (DE)

(73) Assignee: Papst-Motoren GmbH & Co. KG, St. Georgen (DE)

( * ) Notice: Subject to any disclaimer, the term of this patent is extended or adjusted under 35 U.S.C. 154(b) by 34 days.

(21) Appl. No.: 10/182,459

(22) PCT Filed: Dec. 23, 2000

(86) PCT No.: PCT/EP00/13253
§ 371 (c)(1),
(2), (4) Date: Jul. 24, 2002

(87) PCT Pub. No.: WO01/59921

PCT Pub. Date: Aug. 16, 2001

(65) Prior Publication Data

US 2003/0015979 A1 Jan. 23, 2003

(30) Foreign Application Priority Data

Feb. 7, 2000 (DE) .......................................... 100 05 397

(51) Int. Cl.$^7$ ................................................ H02P 7/06
(52) U.S. Cl. ........................ 318/254; 318/138; 318/439; 318/434; 388/806; 388/805
(58) Field of Search ................................ 318/254, 138, 318/439, 434, 805; 388/806

(56) References Cited

U.S. PATENT DOCUMENTS

| 3,873,897 A | 3/1975 | Müller ........................ 318/138 |
| 4,427,931 A | 1/1984 | Tsukihashi .................. 318/317 |
| 4,890,185 A | 12/1989 | Karl ............................. 361/91 |
| 5,161,073 A | * 11/1992 | Gami et al. .............. 360/73.03 |

(List continued on next page.)

FOREIGN PATENT DOCUMENTS

| DE | 31 41 190 A1 | 10/1981 |
| DE | 36 07 014 A1 | 3/1986 |
| DE | 40 03 522 A1 | 2/1990 |

(List continued on next page.)

OTHER PUBLICATIONS

Castagnet & Nicolai, "Digital Control for Brush DC Motor," *IEEE Transactions on Industry Applications*, vol. 30, # 4, Jan. 1994.
Patent Abstracts of Japan summary of Japanese unexamined publication 06–189 586–A, YAJI/OKI Electric, "Control Method For Cooling Fan and Circuit Used For It," published Jul. 8, 1994.
WPI English abstract of DE 23 46 380 & FR 2,244,290, Müller/Papst, publ. May 1975.

*Primary Examiner*—Rita Leykin
(74) *Attorney, Agent, or Firm*—Milton Oliver; Ware Fressola Van der Sluys & Adolphson LLP

(57) ABSTRACT

The invention concerns an arrangement for powering a load (12) that has non-continuous power consumption from a DC power supply (UB). The arrangement has a DC link circuit (14, 22) to which said load (12) can be connected and with which is associated a capacitor (21) that is suitable for briefly supplying energy to the load. A current regulator (24, 30) is provided for connecting the DC link circuit (14, 22) to the DC power supply (UB) in order to deliver a substantially constant current (i) to said capacitor (21) and to a load (12) connected to the link circuit. The target value of said current regulator (30) is adjusted adaptively, by means of a second regulator (34), to the instantaneous power demand of the load (12). An arrangement of this kind can also be referred to as an active filter that is particularly suitable for electronically commutated motors and for motors with a PWM current controller. The arrangement has an electronic fuse (240) which switches off the current regulator (30) when it responds and automatically switches the current regulator (30) back on after a defined time has elapsed, and repeats these switch-on attempts several times if applicable.

33 Claims, 9 Drawing Sheets

U.S. PATENT DOCUMENTS

| | | | | |
|---|---|---|---|---|
| RE34,399 E | * | 10/1993 | Gami et al. | 360/73.01 |
| 5,268,623 A | * | 12/1993 | Muller | 318/434 |
| 5,600,217 A | * | 2/1997 | Bartlett | 318/434 |
| 5,632,000 A | | 5/1997 | Pabst | 388/806 |
| 5,656,910 A | | 8/1997 | Erckert | 318/685 |
| 5,821,709 A | | 10/1998 | Omori | 318/254 |
| 5,838,877 A | | 11/1998 | Elliot | 388/804 |
| 5,896,020 A | * | 4/1999 | Pyo | 318/701 |
| 5,898,296 A | * | 4/1999 | Maddox et al. | 232/282 |
| 5,933,573 A | | 8/1999 | Lukenich | 388/811 |
| 6,321,031 B1 | | 11/2001 | Mohr | 388/801 |

FOREIGN PATENT DOCUMENTS

| | | |
|---|---|---|
| DE | 43 39 553 C1 | 11/1993 |
| DE | 43 40 769 A1 | 11/1993 |
| DE | 299 14 891 U1 | 12/1999 |
| EP | 0 007 622 A1 | 7/1979 |
| EP | 0 321 663 A2 | 10/1988 |
| WO | WO 99-05780 A1 | 2/1999 |

* cited by examiner

1

ARRANGEMENT FOR SUPPLYING A USER, ESPECIALLY A D.C MOTOR, THAT CONSUMES POWER IN A NON-CONTINUOUS MANNER FROM A D.C. SYSTEM

FIELD OF THE INVENTION

The invention concerns an arrangement for powering a load that has non-continuous power consumption, in particular a DC motor, from a DC power supply.

BACKGROUND

In the telecommunications sector in particular, very stringent requirements exist in terms of electromagnetic compatibility (EMC). Electric motors are often used in communication technology systems, e.g. to drive fans, and the output stages of such motors are supplied with pulsed currents, e.g. for current limiting (cf. FIG. 3 below). These pulsed currents cause pulse-containing interference signals on the supply leads to such motors, and very large capacitors and inductances are needed to suppress them. Installation space is often limited, however, and the cost of such filters is high.

The filtering of high-frequency interference generally presents no major problems. Particularly stringent requirements exist, however, in the audible frequency range from 25 Hz to 20 kHz, since a humming background noise is particularly irritating when telephoning. The rotation frequency of such motors lies in the range from 25 to 200 Hz. The highest interference level is therefore reached in this frequency range. It is no longer possible to filter out this low-frequency interference using conventional filters.

SUMMARY OF THE INVENTION

It is therefore an object of the invention to make available a new arrangement for powering a load that has non-continuous power consumption, in particular a DC motor, from a DC power supply, that takes EMC requirements into account.

According to the invention, this object is achieved by means of an arrangement having a first regulator for supplying a substantially constant current, via a transistor to the DC motor and a second regulator which supplies a target value to the first regulator, based upon a voltage at the DC motor, so that the target value is automatically adapted to varying loads of the DC motor. Because a current regulator is used, the direct current that flows to an arrangement according to the present invention during operation has a very low residual ripple. During the time periods in which the load is briefly consuming little or no current, for example because of a control operation, the capacitor associated with the DC link circuit is charged by the current regulator. When the load, typically an electronically commutated motor, briefly requires more current than can be made available by the current regulator, this capacitor is partially discharged and delivers some of its energy to the load.

The DC voltage at the load thus has a small AC voltage component superimposed on it, since the voltage at the capacitor fluctuates because of these charging and discharging operations. But as long as this AC voltage component, which is critically influenced by the size of the capacitor, is small compared to the DC voltage component, it has no influence e.g. on how the motor runs.

What is obtained by means of the invention is thus an active filter that automatically compensates for low-frequency fluctuations in the power consumption of a load, and therefore corresponds very closely to the requirements for electromagnetic compatibility. It is therefore particularly suitable for use in telecommunication systems.

The arrangement is advantageously designed so that the voltage drop at the current regulator corresponds approximately to the AC voltage component of the voltage at the DC link circuit. Surprisingly, this has proven in tests to be very advantageous.

If the load is a motor and if its loading increases, the effect of the current regulator would be to decrease the voltage at the motor because its rotation speed is decreasing, and the voltage and power dissipation in the current regulator would increase accordingly. The invention is therefore advantageously refined by making the target voltage substantially proportional to the voltage drop at the transistor serving as a linear adjusting element. As a result, the current regulator automatically adapts to the power demand of a motor, i.e. if the rotation speed and voltage at the motor decrease, the target value of the current regulator is increased, and if the rotation speed and voltage rise, the target value is reduced. This is therefore an adaptive current regulator that automatically adapts to changes in power demand in a connected motor.

Further details and advantageous developments of the invention are evident from the exemplary embodiments, which are in no way to be understood as a limitation of the invention, that are described below and depicted in the drawings.

BRIEF FIGURE DESCRIPTION

Figure 1:
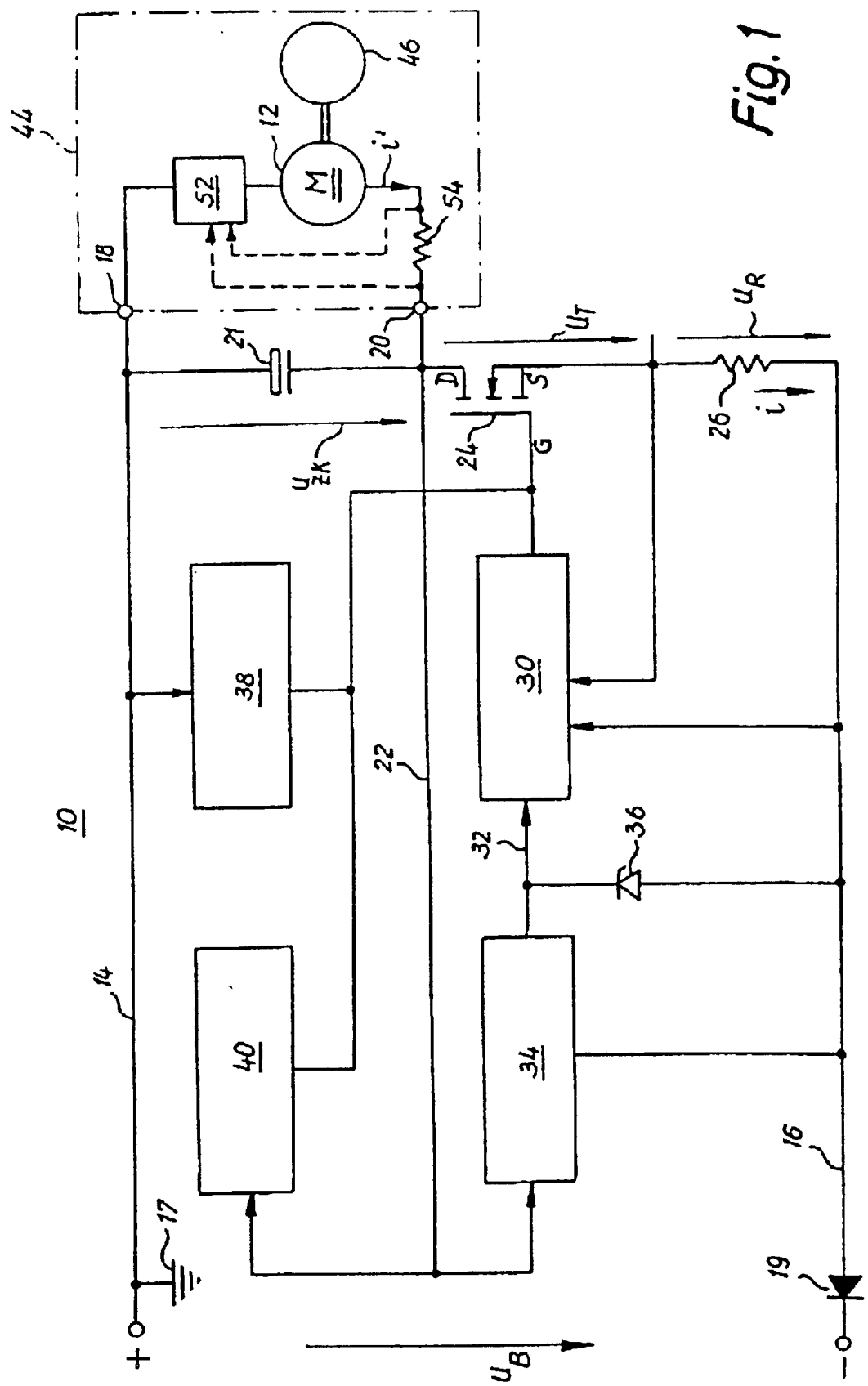
FIG. 1 is a block diagram of a first preferred embodiment of an arrangement according to the present invention.
Figure 2:
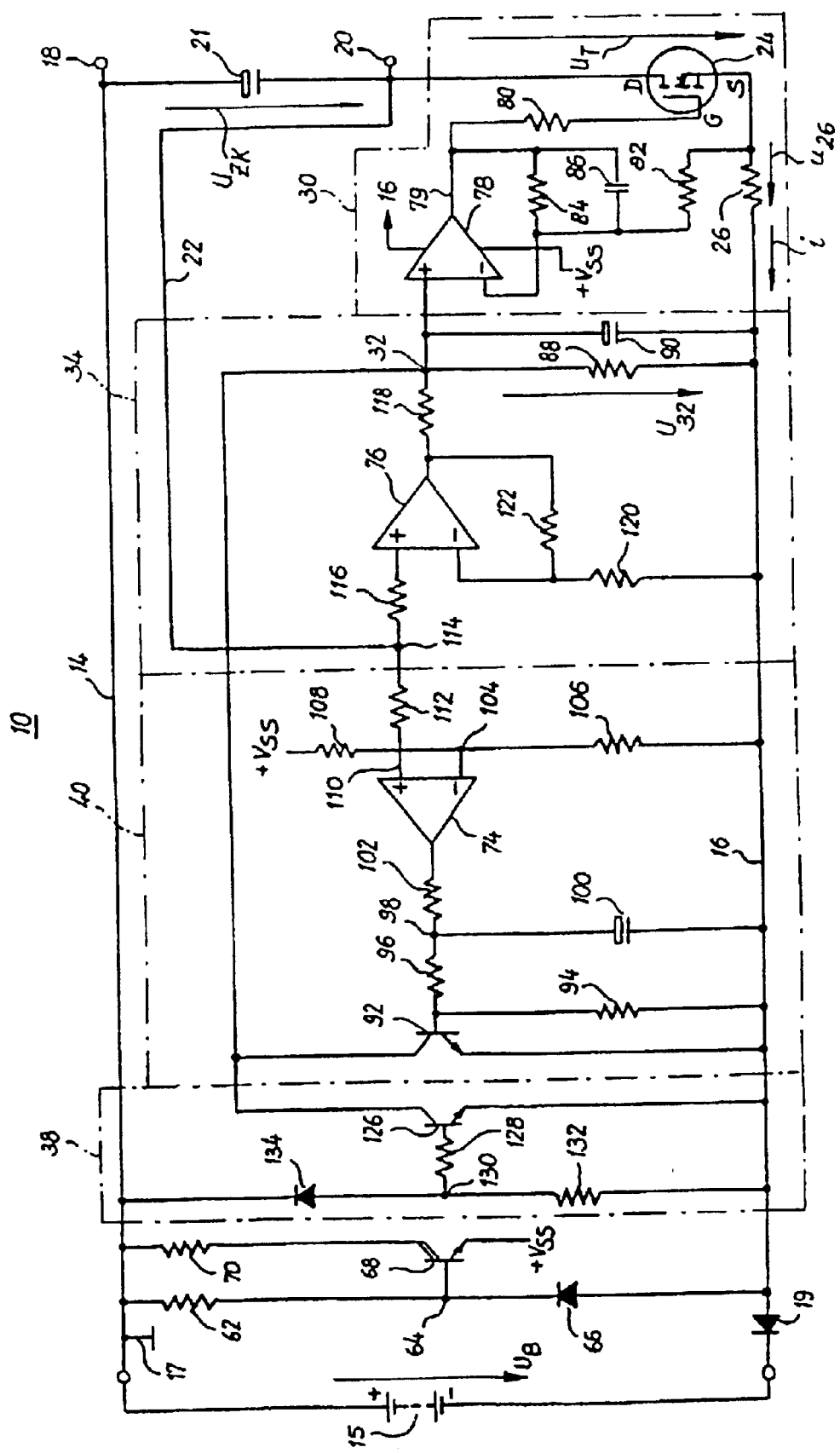
FIG. 2 is a circuit diagram showing details of the exemplary embodiment of FIG. 1.
Figure 3:
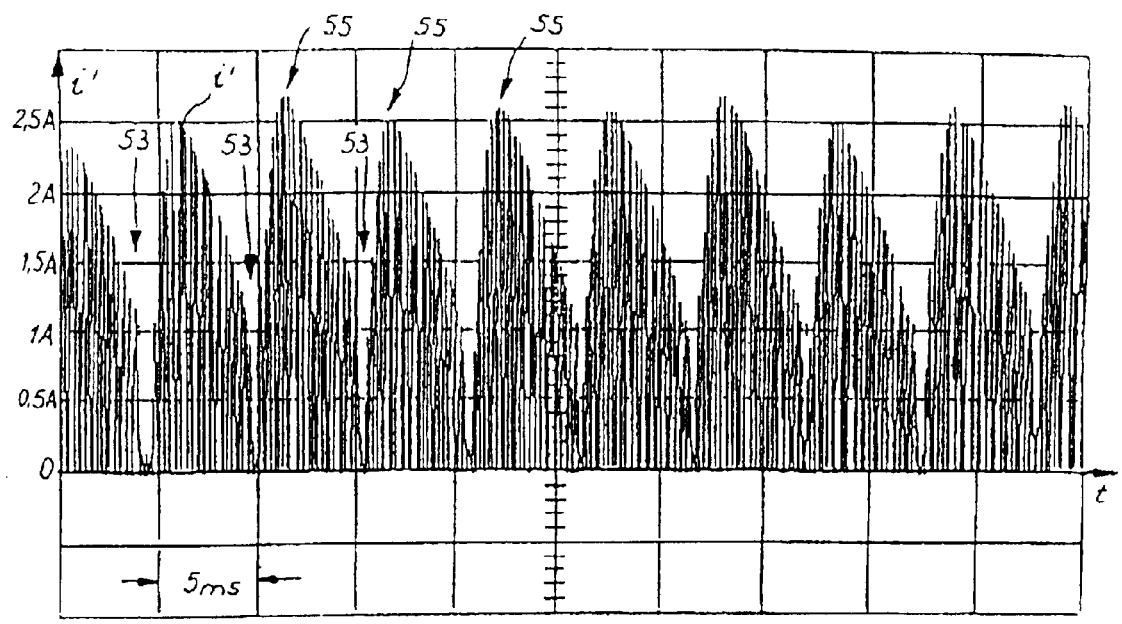
Figure 4:
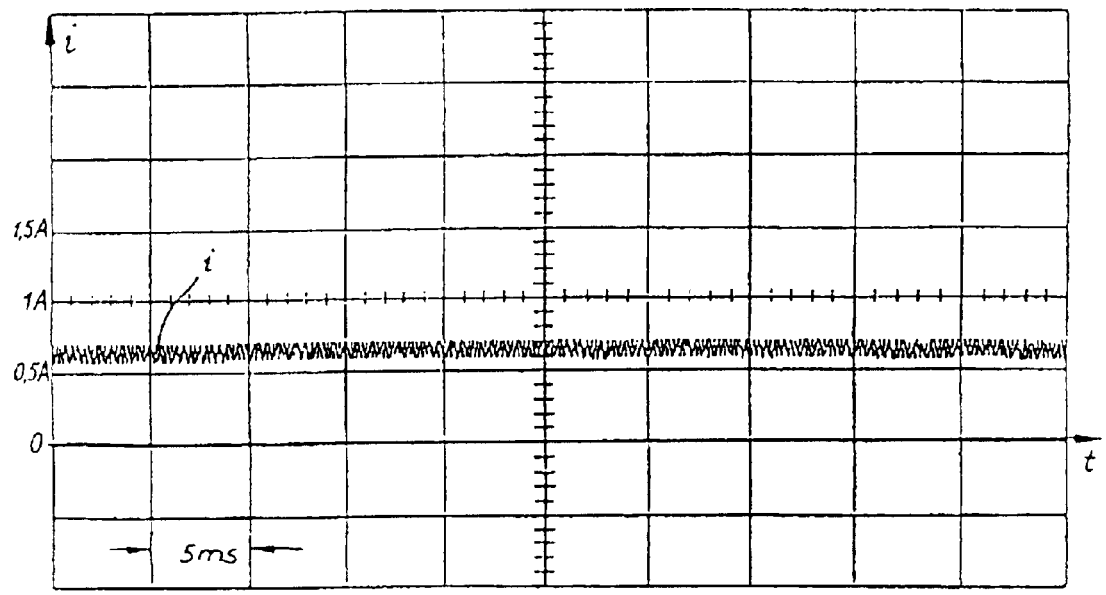
Figure 5:
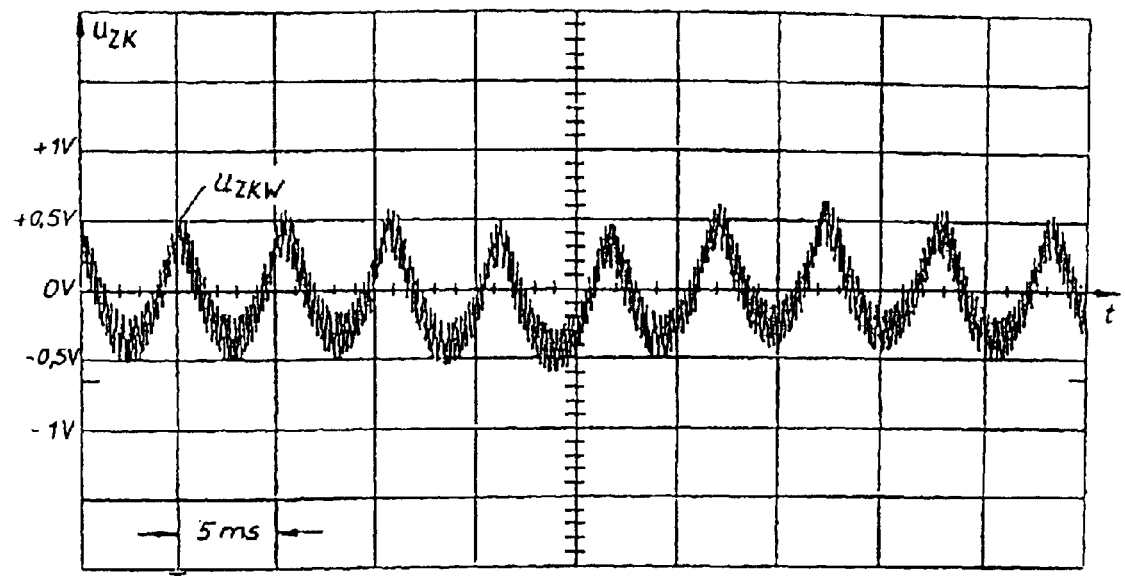
Figure 6:
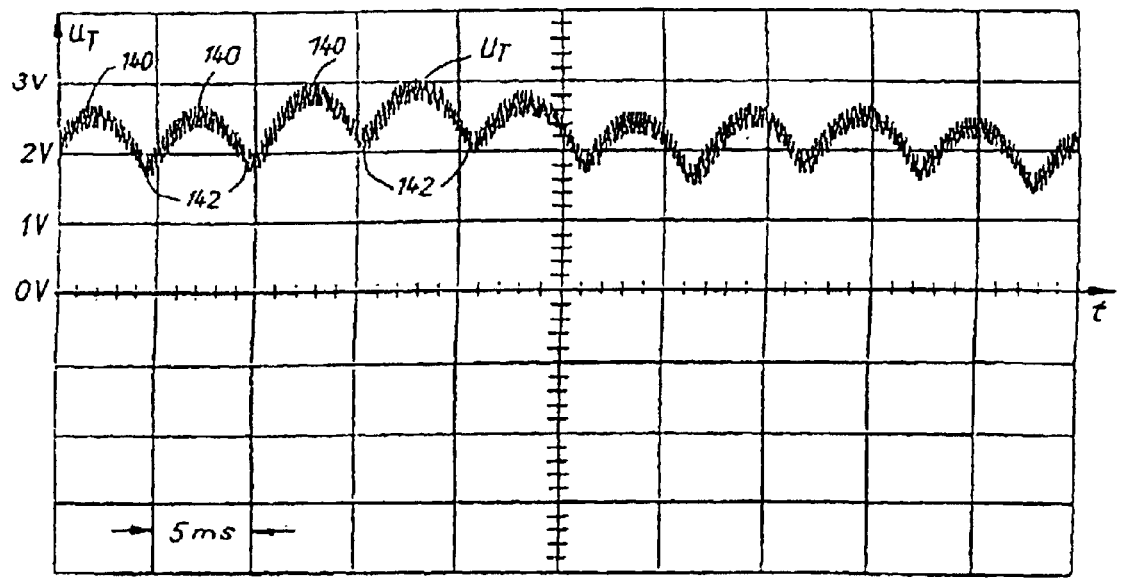
Figure 7:
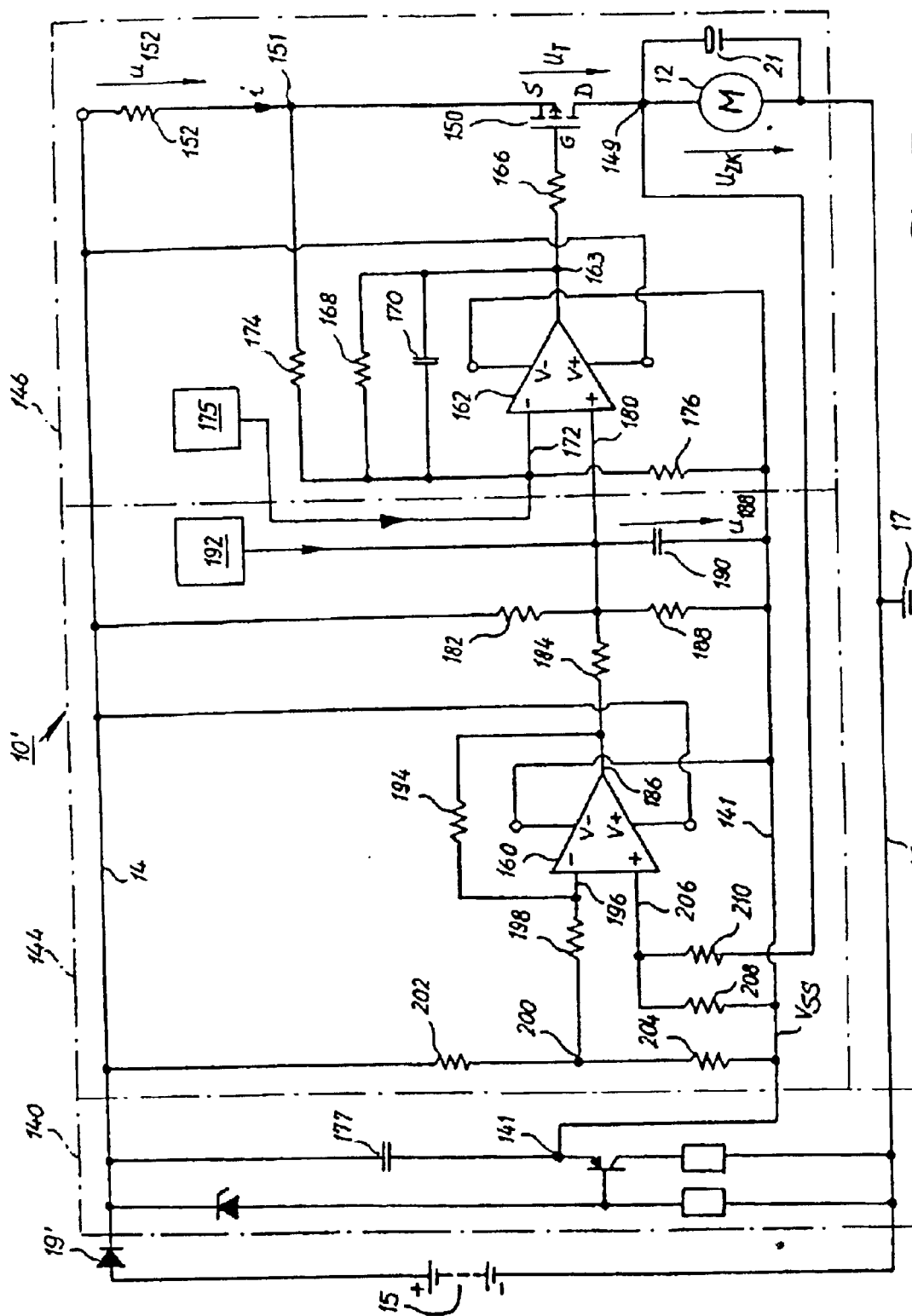
Figure 8:
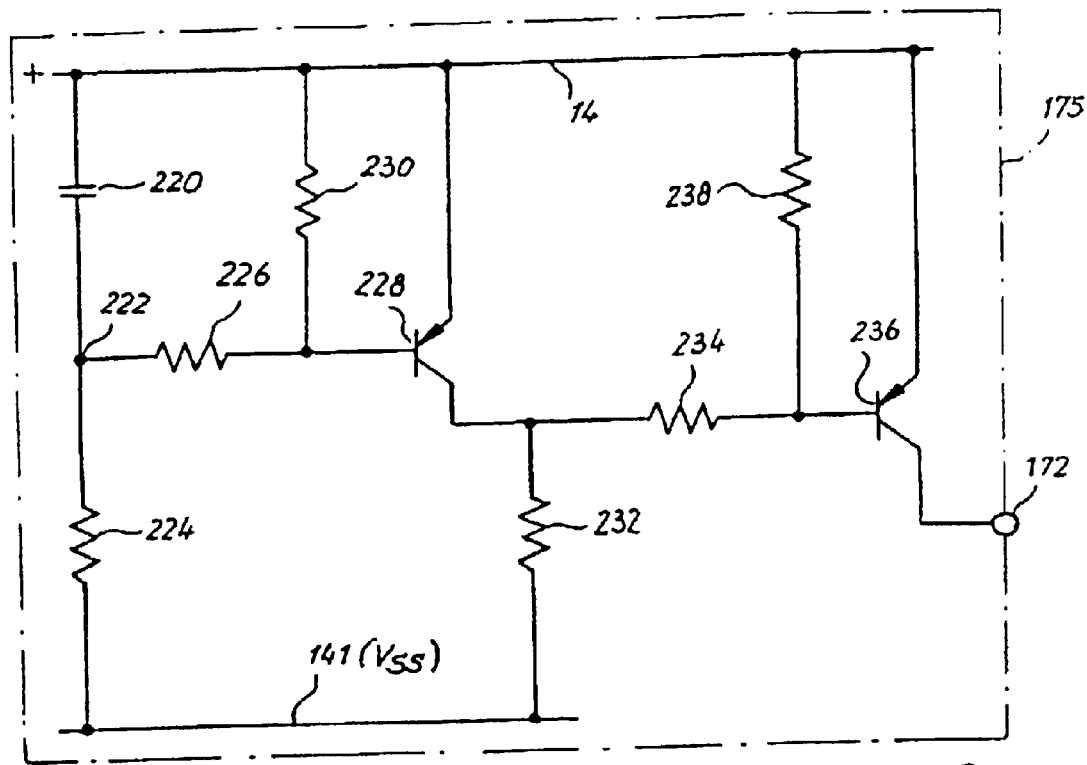
Figure 9:
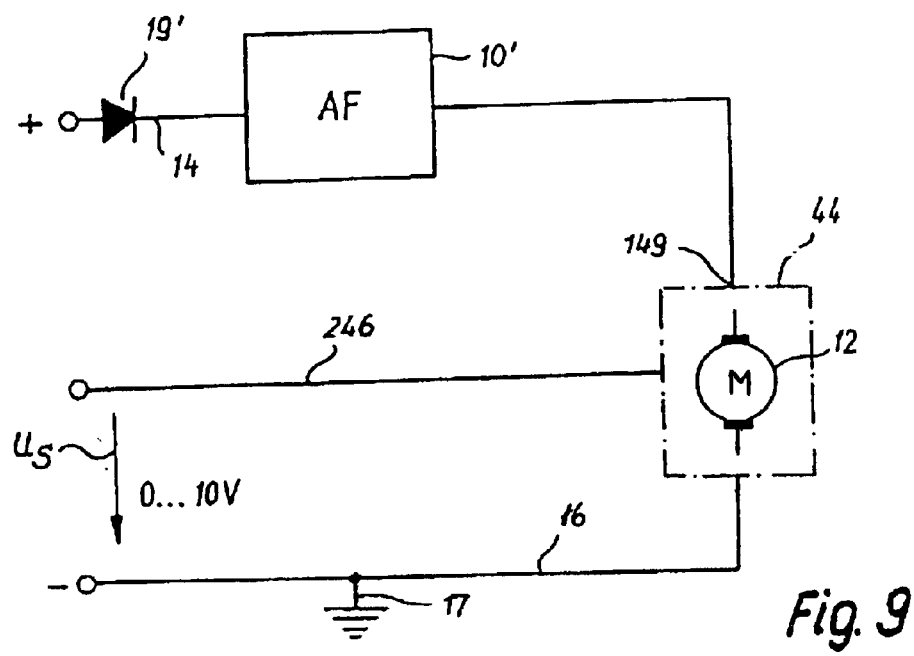
Figure 10:
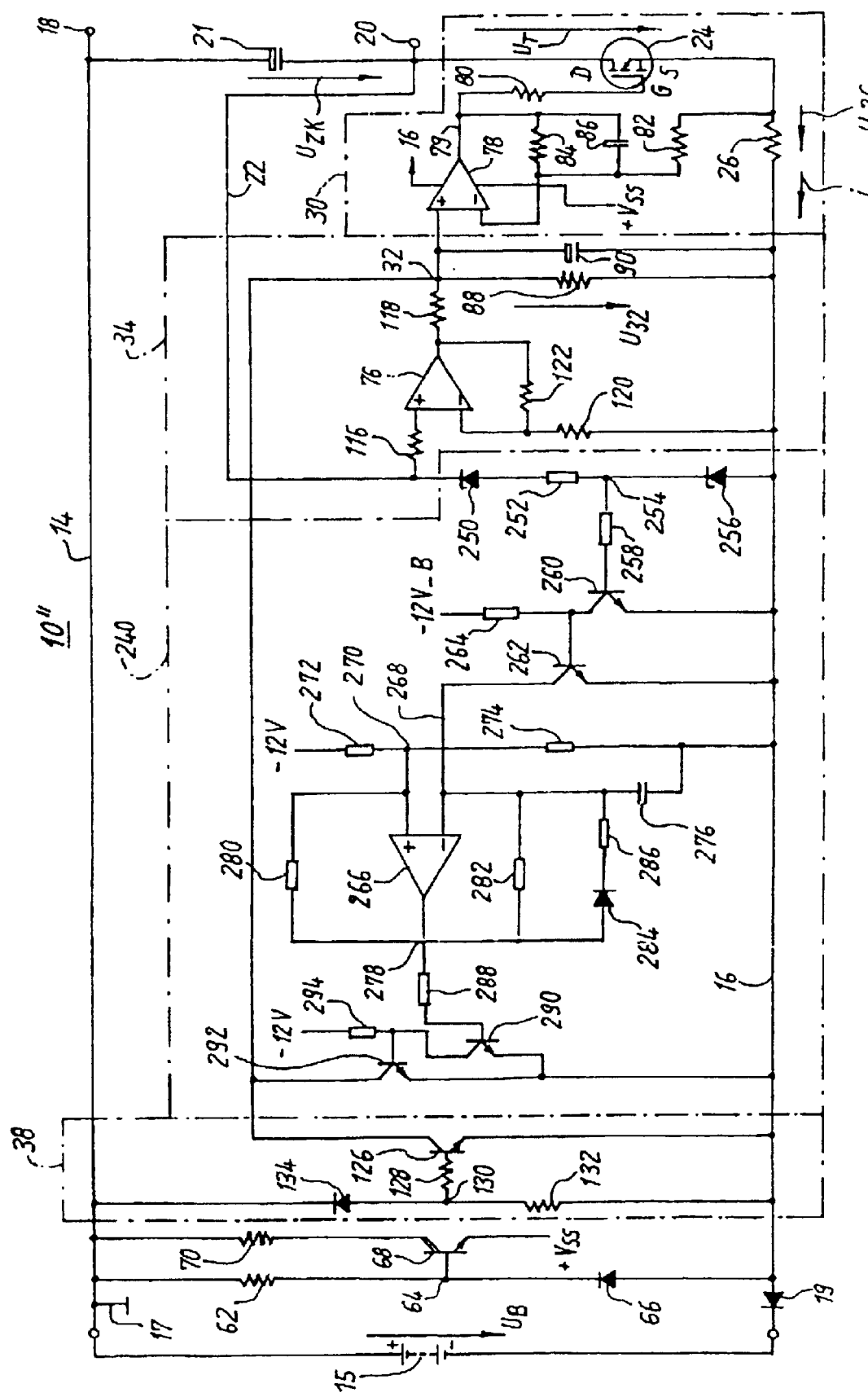
Figure 11:
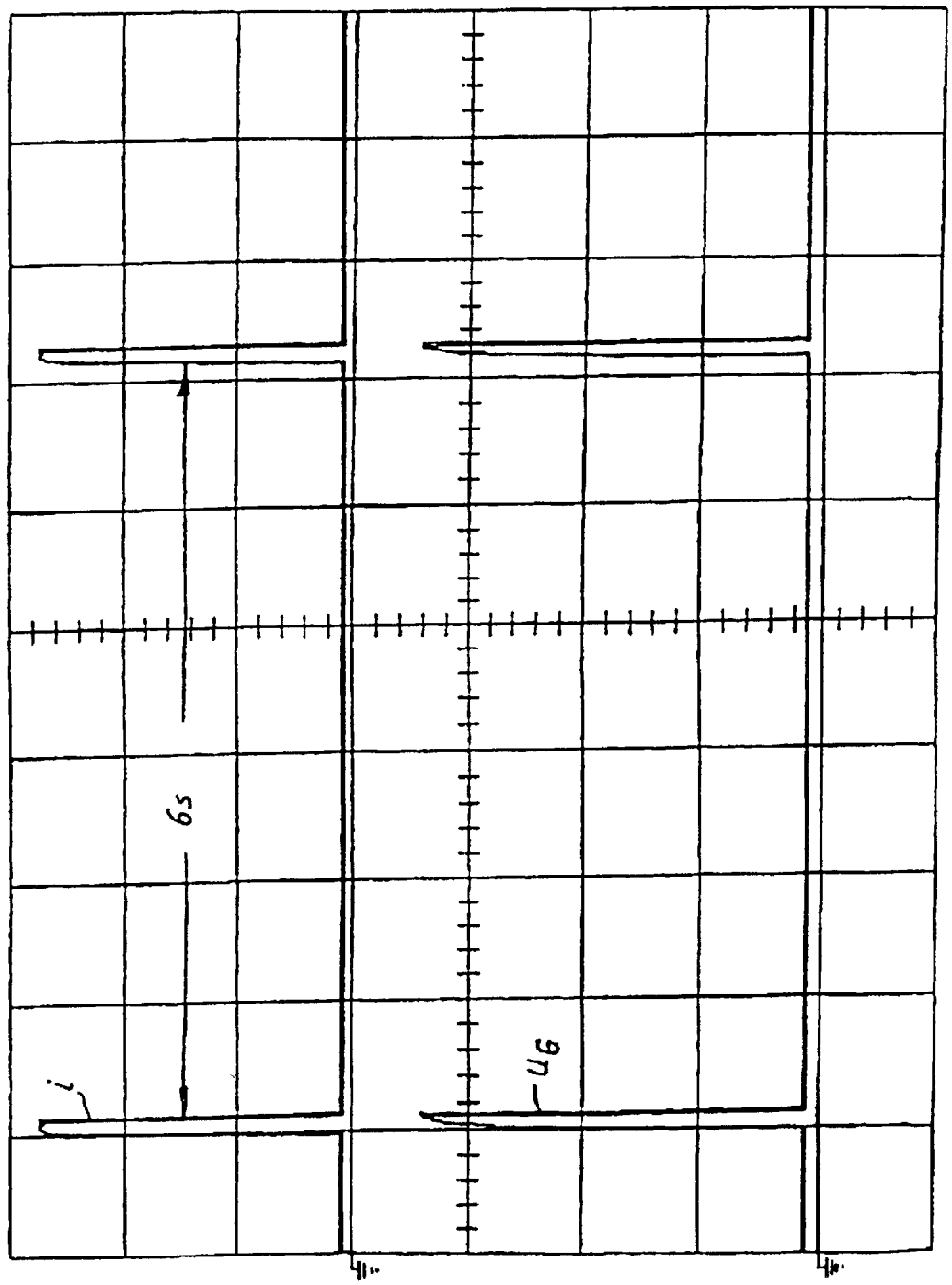

FIG. 3 is a oscillogram of the current, labeled i' in FIG. 1, through a load 12, which in this exemplary embodiment is a two-pulse, two-phase electronically commutated motor as known in principle e.g. from DE 23 46 380 and corresponding U.S. Pat. No. 3,873,897;

FIG. 4 is an oscillogram of the current, labeled i in FIGS. 1 and 2, through measuring resistor 26 of current regulator 30;

FIG. 5 is an oscillogram of the AC voltage component of the voltage labeled UZK in FIGS. 1 and 2;

FIG. 6 is an oscillogram of the voltage, labeled UT in FIGS. 1 and 2, between drain D and source S of MOSFET 24;

FIG. 7 depicts a second exemplary embodiment of the invention, similar to FIG. 2;

FIG. 8 depicts a timing member used in FIG. 7;

FIG. 9 is a highly schematic depiction to explain a detail;

FIG. 10 shows a variant 10" of FIG. 2 in which electronic fuse 240 resets itself at regular intervals;

FIG. 11 is a diagram to explain the manner of operation of FIG. 10; and

Figure 12:
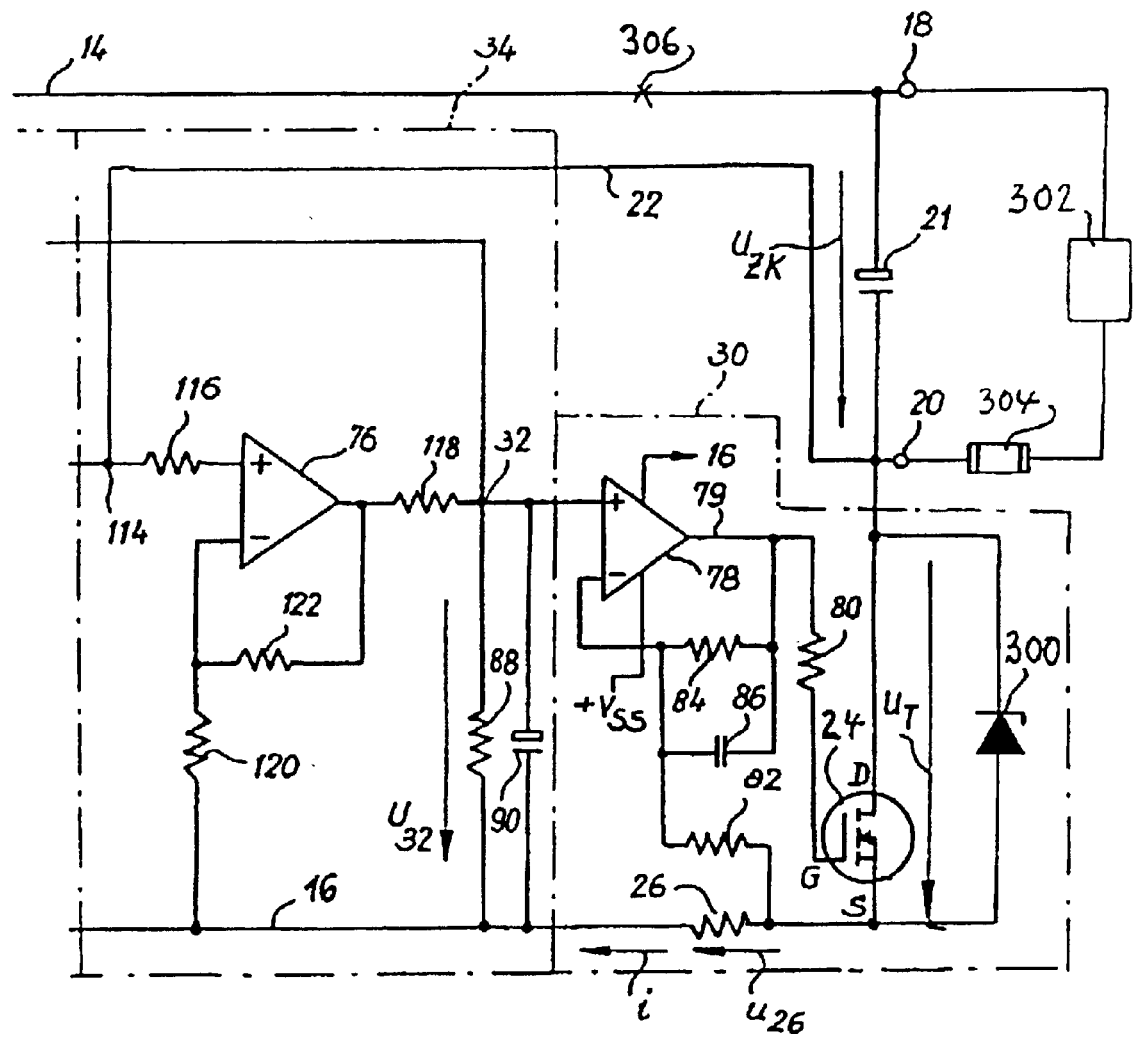

FIG. 12 shows a variant of FIG. 2 or FIG. 10 having an emergency power supply for the case in which MOSFET 24 becomes defective.

In the Figures hereinafter, the same reference characters are used for identical or identically functioning parts, and the parts in question are usually described only once.

DETAILED DESCRIPTION

FIG. 1 is an overview diagram of a first embodiment of an arrangement 10 according to the present invention. It serves to operate a load with non-continuous power consumption, in particular an electric motor 12 of any kind, from a DC voltage UB to which said arrangement is connected by means of a positive line 14 and a negative line 16. In this embodiment, positive line 14 is the reference potential line and is connected to ground 17. A protective diode 19 is present in negative line 16 for protection against improperly polarized connection. Lines 14, 16 can be connected e.g. to a 48-volt battery 15 (FIG. 2) or to an appropriate power supply section. Motor 12 is connected to two outputs 18, 20 of arrangement 10. Output 18 is connected directly to positive line 14, and output 20 to a link circuit voltage 22. Located between outputs 18 and 20 is a high-capacitance capacitor 21, associated with the DC link circuit, that serves as an energy reservoir for load 12.

Located between node 20 and negative line 16 are an N-channel field effect transistor 24 and, in series therewith, a resistor 26 which serves to sense the current i that flows through measuring resistor 26, said current being regulated by arrangement 10 to a substantially constant value.

In the exemplary embodiment of FIGS. 1 through 6, supply line 14 is the reference potential line and an active filter 24, 30 is arranged in negative supply line 16 of motor 12. The reason for this is that the telecommunications industry normally operates with a supply voltage of −48 V, so that the reference potential of 0 V, i.e. the potential on line 14, is positive. Control signals are referred to this +0 V potential. Protective diode 19 is located in the negative supply line so that no voltage drops occur on reference potential line 14. If a motor 12 with a negative reference potential needs to be used, an active filter arranged in the positive branch of motor 12 should be utilized, and in this case negative line 16 is connected to ground. This is shown in FIGS. 7 and 8.

A link circuit voltage UZK is obtained between lines 14 and 22. A voltage UT, which is measured between drain D and source S of transistor 24, occurs at transistor 24 (which is operated as a variable resistor); and a voltage UR whose magnitude depends on the current i is obtained at resistor 26. The operating voltage UB can thus be described as follows:

$$UB = UZK + UT + UR \quad (1)$$

Since UR is usually very small, it is approximately the case that $$UB = UZK + UT \quad (2)$$

The working principle of the present arrangement is that by means of a current regulator 30, the current i through transistor 24 is regulated to a target value 32 that is constant when the load of motor 12 is constant. As a result, a substantially constant and harmonic-free direct current i flows on supply leads 14, 16 of arrangement 10.

If the load on motor 12 changes, target value 32 for current regulator 30 is correspondingly modified by means of a second regulator referred to hereinafter as link circuit regulator 34. For example, if motor 12 slows down because of an increased load, voltage UZK then drops, i.e. voltage UT increases as shown in equation (2). The sum of voltages UT and UR is delivered to link circuit regulator 34, which then increases the current target value 32 of current regulator 30 so that the latter adjusts transistor 24 to a higher current, i.e. a lower resistance, thereby once again increasing the rotation speed of motor 12 and at the same time preventing an overload of transistor 24, since voltage UT there decreases again. (The losses in transistor 24 correspond to the product i * UT, and these losses must not exceed a specific value.)

The arrangement shown in FIG. 1 also comprises a limitation of the current target value at input 32, depicted here symbolically as Zener diode 36. This limits current target value 32 to a permissible value as motor 12 starts, in order to prevent an overload of transistor 24 due to a high start-up current. The same is true in the context of a short circuit. This system also automatically limits a current that occurs upon start-up due to the charging of capacitor 21. That current would otherwise be limited only by the resistance of supply lines 14, 16 and by resistor 26, which together have a value of e.g. 0.5 ohms. For UB=50 V this would result (without current limiting) in a start-up current of 50/0.5=100 A, which could cause damage to switch contacts.

An overvoltage protector 38 is preferably also provided for protection against excessive values of voltage UB. It acts directly or indirectly on gate G of transistor 24 in order to discharge the latter upon occurrence of an overvoltage pulse, thereby limiting voltage UZK at motor 12 and protecting it from damage due to overvoltage.

In addition, a fuse function 40 is preferably also provided in order to protect transistor 24 from overload. If voltage UT rises above a defined value that corresponds to a value higher than that specified by the maximum target value 32 at the output of link circuit regulator 34, transistor 24 is switched off directly at its gate G after a defined time interval. The defined time is selected so that transistor 24 cannot heat up excessively. In order to switch motor 12 on again after fuse 40 has responded, arrangement 10 must be briefly switched off. This therefore corresponds to the principle of an electronic fuse.

In exemplary and highly schematic fashion, FIG. 1 shows motor 12 as part of a motor arrangement 44 in which motor 12 drives a load 46, for example a fan wheel. Current i' through motor 12 is sensed at a resistor 54 and conveyed to a regulator 52 in order to limit said current i' at startup of motor 12. Current i' through motor 12 which can occur at startup as a result of the internal current limitation of arrangement 44 is preferably set to be lower than the maximum value of current i that does not yet result in triggering of electronic fuse 40. The result is that electronic fuse 40 responds only in the event of a fault.

Such operations (current limiting) are today often performed using a PWM controller, so that current i' in motor 12 takes the form of short pulses (see FIG. 3). If motor 12 is an electronically commutated motor, current i' through the motor takes the form of low-frequency pulses (at a frequency in the range of 25 to 200 Hz) even without a PWM controller. Pulses of this kind create problems in many applications, e.g. in telecommunications systems. With conventional filters, it is almost impossible in practice to filter out such low-frequency interference; in other words, electromagnetic compatibility (EMC) requirements are practically impossible to meet for the lower frequencies using conventional means.

FIG. 3 shows a typical example of a motor current i' that takes the form of short pulses at relatively high frequency, superimposed on which is a low-frequency component caused by commutation of electronically commutated motor 12, so that at regular intervals (points 53) current i' becomes zero. The low-frequency component usually has a frequency in the range 25–200 Hz.

The procedure according to the invention is therefore that current i is regulated by current regulator 24, 30 to a constant value. At points 53 at which motor 12 is consuming very little or no current, capacitor 21 is charged by current regulator 24, 30.

At points 55 (FIG. 3) where motor 12 has a high current consumption, the motor is powered partly via current regulator 24, 30 and partly from capacitor 21. The consequence is that a rippled DC voltage, i.e. a DC voltage with a small superimposed AC voltage component, occurs at capacitor 21. This AC voltage component uzkw is depicted in FIG. 5. Its upper peak value is e.g. +0.5 V, and its lower peak value −0.5 V. Electronically commutated DC motors, in particular, are relatively insensitive to a superimposed AC voltage of this kind.

FIG. 4 shows current i through resistor 26, which in an arrangement of this kind has a largely constant value. FIGS. 3 and 4 use the same scale for the time axis t and for the values of currents i' and i, and the enormous improvement resulting from the present invention is evident. In FIG. 4, for example, current i is approx. 0.6 A, whereas the peak values of current I' occurring in motor 12 itself are up to 2.7 A.

Arrangement 10 or 10' (FIG. 7) is preferably designed in such a way that the AC voltage component of voltage UT corresponds approximately to the AC voltage component uzkw of voltage UZK, e.g. 1 V. Superimposed on the latter value, as the so-called offset, is the voltage drop of approx. 1.5 V at the semiconductor sections of transistor 24, so that UT fluctuates e.g. between 2 and 3 V, as depicted in FIG. 6. That value of UT is advantageous also because the current to motor 12 can decrease briefly, and in such a case capacitor 21 should not be fully charged, since it must then briefly accept the regulated current i from current regulator 24, 30. This is referred to as a control reserve. In the case of a fan, for example, a gust of air can briefly decrease the power demand, and a portion of the regulated current then flows into capacitor 21, thereby raising UZK and correspondingly lowering UT.

An arrangement 10 or 10' according to the present invention can also be referred to as an "active filter," since it actively filters out interference pulses that otherwise would occur on supply lines 14, 16.

FIG. 2 shows a first preferred embodiment of the present invention. Diode 19 is located in negative line 16. The arrangement as shown in FIG. 2 or 7 can also be incorporated directly into a motor 44 if particularly stringent requirements exist regarding the electromagnetic compatibility of that motor.

From positive line 14, a resistor 62 leads via a node 64 to a Zener diode 66 whose anode is connected to negative line 16. Connected to node 64 is the base of an npn transistor 68 that is wired as an emitter follower, so that the potential +Vss at its emitter corresponds substantially to the potential at node 64. Its collector is connected via a resistor 70 to positive line 14. The result is to produce at the emitter of transistor 68 a regulated DC voltage that serves, inter alia, to supply power to three operational amplifiers (OAs) 74, 76, and 78, this being depicted only for OA 78. The latter is thus connected to potential +Vss and to negative line 16, i.e. to potentials of e.g. −36 V and −48 V, referred to positive line 14 with its potential of 0 V.

Gate G of N-channel MOSFET 24 is connected via a resistor 80 to output 79 of OA 78. Transistor 24 is conductive when this output is high, and blocked when it is low. In the region between high and low, transistor 24 acts as a variable resistor whose value can be modified by the voltage at gate G. A transistor of this kind is said to "operate in linear mode."

Source S of transistor 24 is connected via current sensing resistor 26 to negative line 16, and additionally via a resistor 82 to the negative input of OA 78, which in turn is connected to output 79 via a resistor 84 and a capacitor 86 in parallel therewith.

Negative line 16 is connected, via a resistor 88 and a capacitor 90 in parallel therewith, to positive input 32 of OA 78, to which a current target value is delivered from the output of OA 76 via a resistor 118. Also connected to positive input 32 is the collector of an npn transistor 92 that is part of electronic fuse 40.

The output of OA 76 is connected via a negative feedback resistor 122 to its negative input, which is connected via a resistor 120 to negative line 16. The positive input of OA 76 is connected via a resistor 116 and a node 114 to line 22, i.e. to link circuit voltage UZK.

The emitter of transistor 92 is connected to negative line 16. Its base is connected via a resistor 94 to negative line 16 and via a resistor 96 to a node 98, which in turn is connected via a capacitor 100 to negative line 16 and via a resistor 102 to the output of OA 74 (connected as a comparator).

Negative input 104 of comparator 74 is connected via a resistor 106 to negative line 16, and via a resistor 108 to regulated voltage Vss. Negative input 104 is thus at a constant reference potential. Positive input 110 of comparator 74 is connected via a resistor 112 to node 114, which is connected to link circuit line 22.

The collector of transistor 92, as well as the collector of an npn transistor 126, is connected to node 32. The emitter of transistor 126 is connected to negative line 16. Its base is connected via a resistor 128 to a node 130, which in turn is connected via a resistor 132 to negative line 16 and via a Zener diode 134 to positive line 14.

Manner of Operation

Upward limitation of the current target value, namely voltage u32 at resistor 88 is established by way of the values of resistors 118 and 88. The maximum output voltage of OA 76 corresponds to the supply voltage Vss (e.g. +12 V) that is delivered to said OA. The upper limit value of current target value u32 can be set very precisely by way of the ratio of resistors 118 and 88, since it is defined as $$u32 = Vss * R88/(R118+R88) \quad (3)$$

Alternatively, a Zener diode could also be used instead of resistor 88, but that imposes a limitation to specific voltage values, and the upper limit value of u32 can be set much more precisely using the voltage divider just described.

During operation, current i causes a voltage drop u26 at measuring resistor 26, and the difference (u32−u26) is amplified by OA 78 and integrated by capacitor 86. The integration yields, at output 79 of OA 78, a DC voltage signal that linearly controls field effect transistor 24 via resistor 80.

If, for example, voltage u26 (which serves as the true current value signal) is lower than voltage u32, i.e. if the potential at the positive input of OA 78 is higher than the potential at the negative input, the DC voltage at the output of OA 78 is increased and transistor 24 experiences greater activation, so that current i becomes higher. Conversely, if voltage u26 is greater than u32, current i through transistor 24 is then reduced, so that said current i is therefore regulated by current regulator 30 to a constant value.

Current regulator 30 has a PT1 characteristic, i.e. the characteristic of a proportional controller with a first-order timing member. The gain factor is $$Kp = -R84/R82 \quad (4),$$

and the time constant T1 is $$T1 = R84 * C86 \quad (5).$$

Link Circuit Regulator 34

Voltage UT at transistor 24 is conveyed via resistor 116 to the positive input of OA 76 and amplified. The latter is once again a proportional controller with a first-order timing member, i.e. a PT1 controller. Its gain factor Kp is $$Kp = R122/R120 \quad (6)$$

Whereas timing member 84, 86 in current regulator 30 is implemented as an active timing member in the negative feedback from output 79 to the negative input of OA 78, in link circuit regulator 34 it is arranged passively at the output of OA 76 (resistors 118, 88 and capacitor 90). This has the advantage that any interference is thereby simultaneously filtered out from overvoltage shutoff 38 and fuse function 40.

If voltage UT rises (i.e. voltage UZK decreases) as a result of an increasing load on motor 12, OA 76 generates a higher potential at its output, i.e. target value u32 for current regulator 34 is raised. In the manner already described, the upper limit of this target value is defined by the ratio of resistors 118 and 88.

When target value u32 rises as a result, transistor 24 becomes more conductive, so that voltage UT once again decreases and voltage UZK increases.

Since link circuit regulator 34 has a higher time constant than current regulator 30 because of capacitor 90 (e.g. 3.3 uF), it reacts only to longer-lasting changes in UT or UZK. This has proven to be advantageous so that the arrangement described here does not tend to oscillate; in other words, link circuit regulator 34 should react only slowly in order to ensure the desired adaptive behavior.

Because current regulator 30 acts directly on the input of supply voltage UB, it is not only the starting current of motor 12 that is limited, but also the startup current pulse that occurs upon startup as a result of the charging of capacitor 21, which otherwise could assume large values (e.g. 100 A).

Fuse Function 40

Voltage UT is conveyed from line 22 via resistor 112 to the positive input of comparator 74. As already described, a constant potential defined by the ratio of resistors 106, 108 is present at negative input 104.

If the potential at positive input 110 becomes higher than the potential at negative input 104, the output of comparator 74 then becomes high and capacitor 100 is charged through resistor 102. Resistor 102 and capacitor 100 constitute a first-order timing member which determines the time required by transistor 92 to become fully conductive, i.e. the time until the fuse function responds, and its sensitivity. The sensitivity of fuse function 40 can be modified in the desired fashion by dimensioning resistor 102 and capacitor 100.

When transistor 92 becomes conductive it reduces voltage u32, so that transistor 24 becomes less conductive. As soon as transistor 24 has switched off completely, a "high" potential is continuously present at the positive input of comparator 74; as a result, comparator 74 goes into "latch" mode and arrangement 10 is permanently switched off. In order to be switched on again, the entire arrangement 10 must be switched off and then switched back on.

Overvoltage Protector 38

In the event of short-term voltage spikes in voltage UB, Zener diode 134 becomes conductive and makes transistor 126 conductive, so that voltage u32 is correspondingly reduced and transistor 24 becomes less conductive. Voltage spikes of this kind thus do not affect motor 12. If the overvoltage persists for a longer period, fuse function 40 takes effect and switches off motor 12 in the manner already described.

FIG. 5 shows the changes in the AC voltage component of voltage UZK that occur at capacitor 21 during operation of motor 12. This (small) AC voltage component is superimposed on the DC voltage at motor 12. It constitutes, for example, 2% of voltage UZK.

FIG. 6 shows the changes in voltage UT, which fluctuates continually between a maximum value 140 and a minimum value 142.

EXAMPLES OF VALUES FOR FIG. 2

| | |
|---|---|
| UB | 48 V (38–72 V) |
| Power consumption of motor 12 | 30 W (0–60 W) |
| Operational amplifiers 74, 76, 78 | LM2902D |
| Transistors 92, 126 | BC846B |
| Transistor 68 | BST39 |
| Transistor 24 | IRF640 |
| Zener diode 66 | BZX284C12 |
| Zener diode 134 | BZD27C82 |
| Capacitor 21 | 470 uF |
| Capacitor 100 | 1 uF |
| Capacitor 90 | 3.3 uF |
| Capacitor 86 | 4.7 nF |
| Resistors 62, 108, 112, 120, 122, 128 | 10 kOhms |
| Resistor 70 | 1 kOhm |
| Resistor 132 | 120 kOhms |
| Resistor 94 | 11 kOhms |
| Resistor 96 | 82 kOhms |
| Resistors 102, 116 | 100 kOhms |
| Resistor 106 | 4.7 kOhms |
| Resistor 118 | 39 kOhms |
| Resistor 78 | 7.5 kOhms |
| Resistor 84 | 22 kOhms |
| Resistor 82 | 4.7 kOhms |
| Resistor 26 | 77 Ohms |
| Resistor 80 | 1 kOhm |
| Resistor 88 | 5.1 kOhms |

FIG. 7 shows an arrangement 10' in which the current regulator is arranged in positive supply line 14, while negative supply line 16 serves as reference potential and is connected to ground 17. Only the essential functions are explicitly depicted in FIG. 7. Protective diode 19' is located in positive supply line 14 in this instance.

Located once again at the extreme left is battery 15, e.g. 48 V, and next to it a power supply section 140 which generates at its output 141 a voltage Vss that e.g. is 12 V lower than the potential of positive line 14. The reader is referred to the description of parts 62, 66, 68, 70 of FIG. 2 regarding the manner of operation of the power supply section.

A link circuit regulator 144 is located to the right of power supply section 140, and a current regulator 146 to the right of that. The motor is once again labeled 12, and the link circuit capacitor 21.

Connected to motor 12 via a node 149 is a P-channel field effect transistor 150 whose drain D is connected to a node 149, and whose source S is connected via a node 151 and a measuring resistor 152 to positive line 14. At measuring resistor 152, current i during operation causes a voltage drop u152 which is regulated by current regulator 146 to a value corresponding to a target value u188 that is defined for current regulator 146 by link circuit regulator 144. Link circuit regulator 144 generates this target value in dependence on the magnitude of (u152+UT), i.e. if this value rises because voltage UZK at motor 12 decreases, the target value for current regulator 146 is increased; and if that voltage drops, target value u188 is reduced. What is thereby obtained is an adaptive control system, i.e. current regulator 146 adjusts itself adaptively (i.e. slowly) to the power demand of motor 12.

Arrangement 10' uses two OAs 160, 162 that, for voltage supply purposes, are connected in the manner depicted to positive line 14 and to output 141 of power supply section 140, and consequently are at an operating voltage of e.g. 12 V, i.e. at potentials of +48 V (line 14) and +36 V (line 141).

Output 163 of OA 162 is connected via a resistor 166 to gate G of transistor 150. It is additionally connected via a resistor 168 to negative input 172 of OA 162. A capacitor 170 is connected in parallel with resistor 168, and these together constitute an active timing member in the form of a negative feedback for OA 162. Negative input 172 is additionally connected via a resistor 174 to node 151 and via a resistor 176 to line 141 (Vss). Also connected to input 172 is a timing member 175 which is depicted in FIG. 8 and whose purpose is to block transistor 150 until a capacitor 177 of power supply section 140 has charged to its operating voltage. Without timing member 175, transistor 150 would be fully conductive immediately after arrangement 10' is switched on, which would result in a large charging current to capacitor 21.

If current i increases, voltage u152 becomes greater and the potential of node 151 therefore becomes more negative. Negative input 172 thus also becomes more negative, depending on the voltage divider ratio of resistors 174 and 176. In this fashion, actual value u152 thus also acts on negative input 172 of operational amplifier 162.

Positive input 180 of OA 162 is connected to positive line 14 via a resistor 182, to output 186 of OA 160 via a resistor 184, and to line 141 via a resistor 188 and a capacitor 190 connected in parallel therewith. Capacitor 190 and resistor 188 form a timing member for regulator 144. A functional unit 192, e.g. an electronic fuse (40 in FIG. 1) or an overvoltage protector (38 in FIG. 1), can also be connected to input 180.

Output 186 of OA 160 is connected via a negative feedback resistor 194 to its negative input 196, which in turn is connected via a resistor 198 to a node 200 that is connected via a resistor 202 to positive line 14 and via a resistor 204 to line 141. Node 200 has a constant potential, so that negative input 196 is at a reference potential.

Positive input 206 of OA 160 is connected via a resistor 208 to line 141 and via a resistor 210 to node 149. The voltage at the link circuit of motor 12 is thereby delivered to input 206.

Resistors 184, 188 determine, by means of their ratio, the maximum value of voltage u188 which is delivered to input 180 of current regulator 146 as the target value. Specifically, the maximum potential of output 186 of OA 160 can be that of positive line 14, and the minimum that of line 141; in the former case the voltage is $$u188 = Vss \cdot R188/(R184+R188) \quad (7)$$

This defines the maximum value of current i.

Voltage u188 is conveyed to input 180 of OA 162; and if input 180 has a more positive potential than input 172, the current in transistor 150 is reduced until the potential at input 172 corresponds substantially to the potential at input 180. Conversely, if the potential at input 180 is more negative than the potential at input 172, the current in transistor 150 is then increased until the potential at input 172 substantially corresponds to the potential at input 180.

Target value u188 and actual value u152 thus act on different inputs of OA 162.

If the rotation speed of motor 12 decreases because of a load, voltage UZK then decreases and voltage UT rises correspondingly. The potential at node 149 is conveyed via resistor 210 to input 206 of OA 160, and the potential difference between inputs 196, 206 thus increases, causing output 186 to become more positive and u188 to rise. The consequence of this is that current i through transistor 150 is increased in the manner already described, thereby causing UZK once again to rise.

The two regulators 144 and 146 are thus proportional controllers with a first-order timing member (called PT1 controllers), although the time constant of regulator 144 is greater than that of regulator 146 because regulator 144 is intended to react only slowly, while regulator 146 should react very quickly.

FIG. 8 shows the configuration of timing member 175 used in FIG. 7, which blocks transistor 150 for a defined period of time after startup until arrangement 10' is fully activated. A timing member of this kind is not absolutely necessary in arrangement 10 as shown in FIG. 2.

A capacitor 220 is arranged between a node 222 and positive line 14. From node 222, a resistor 224 leads to line 141 and a resistor 226 to the base of a pnp transistor 228 that is connected via a resistor 230 to positive line 14, to which the emitter of transistor 228 is also connected. Its collector is connected via a resistor 232 to line 141 and via a resistor 234 to the base of a pnp transistor 236 that is connected via a resistor 238 to positive line 14, to which the emitter of transistor 236 is also connected. Its collector is connected to terminal 172 of OA 162.

At startup, the discharged capacitor 220 represents a short circuit for resistors 226, 230, so that transistor 228 initially remains blocked. When capacitor 220 has charged to a defined voltage, this is sufficient to make transistor 228 conductive. As a result, the latter constitutes a short circuit for resistors 234, 238 so that the previously conductive transistor 236 now becomes blocked.

As long as transistor 236 is conductive, negative input 172 of OA 162 receives the potential of positive line 162, thereby blocking transistor 150. When transistor 236 becomes nonconductive, it has no further influence on current regulator 146, and the latter then operates normally and also limits the charging current of capacitor 21 that occurs at startup, which without such limitation could assume very high values.

| | |
|---|---|
| UB | 48 V (38–72 V) |
| Power consumption of motor 12 | 30 W (0–60 W) |
| OAs 160, 162 | LM324 |
| Transistor 150 | IRF9130 |
| Transistors 228, 236 | BC558A |
| Capacitor 21 | 1000 uF |
| Resistor 152 | 0.33 Ohms |
| Resistors 202, 204, 224, 232, 234, 238 | 10 kOhms |
| Resistor 194 | 11 kOhms |
| Resistor 174 | 4.7 kOhms |
| Resistor 168 | 16 kOhms |
| Resistor 166 | 1 kOhm |
| Resistor 176 | 13 kOhms |
| Resistor 182 | 54 kOhms |
| Resistor 188 | 130 kOhms |
| Resistor 184 | 82 kOhms |
| Resistor 208 | 560 kOms |
| Resistor 210 | 100 kOhms |
| Resistor 226 | 6.8 kOhms |
| Resistor 230 | 2.2 kOhms |
| Capacitor 170 | 4.7 nF |
| Capacitors 177, 190 | 3.3 uF |
| Capacitor 220 | 2 uF |

An arrangement according to the present invention can yield the following advantages, among others:

The regulated current i is dependent on the load on motor 12 (adaptive characteristic of regulator).

Current regulation is preferably accomplished with a MOSFET that is operated as a variable resistor ("linear regulation").

Voltage UZK at the link circuit is preferably sensed not directly, but rather indirectly via voltage UT at transistor 24 or 150. This is possible because in this operating mode voltage UR is largely constant, and because transistor 24 or 150 is linearly regulated.

The maximum target value of current regulator 30 (at its input 32) or 147 (at its input 180) is limited to a defined value. In the context of a motor, this can be used to limit the starting current. Another result thereof is to limit the startup current caused by the charging of capacitor 21, which otherwise could reach very high values.

Upon occurrence of a fault, e.g. a short circuit, the current limitation function mentioned in the item above is active for a longer time. In order to prevent overloading of MOSFET 24 or 150, the latter is then completely switched off after a defined time has elapsed. Switching off the supply voltage allows arrangement 10 or 10' to be activated again.

If voltage spikes occur, voltage UZK at motor 12 is limited by way of the linearly regulated MOSFET 24 or 150.

The principle described here of an active EMC filter can be used both in negative line 16 and in positive line 14 of supply voltage UB. FIGS. 1 and 2 show an example of an active filter in the negative line, and FIGS. 7 and 8 an example of an active filter in positive supply line 14.

Because no inductances or other conventional filter elements are required in the context of the invention in order to filter the current, it is possible to transfer control signals for motor 12 on supply line 14 (referring to FIG. 2) and on supply line 16 (referring to FIG. 7).

FIG. 9 shows, in highly schematic fashion, the transfer of a control signal Us in an arrangement similar to that of FIGS. 7 and 8 in which active filter 10' is located in positive line 14. It is assumed that motor arrangement 44 has conveyed to it, via a line 246, signal Us—e.g. a target value for current limitation of motor 12—that is variable between 0 and 10 V. Very advantageously, this signal Us can be referred directly to negative line 16, which is connected to ground 17. (In FIG. 1, Us would be referred to line 14.)

Signal transfer therefore requires no optocouplers or potential-free differential amplifiers; this reduces the complexity for such a signal transfer, e.g. including the transfer of fault signals from motor 12 to a central monitoring system.

FIG. 10 shows a variant 10" of FIG. 2. It uses an electronic fuse 240 configured similarly to fuse 40 of FIG. 2, i.e. if voltage uT at MOSFET 24 becomes too high, fuse 240 activates and switches MOSFET 24 off. In contrast to FIG. 2, however, fuse 240 has an automatic reset function; in other words, in the exemplary embodiment the fuse is automatically reset after approx. six seconds. A check is then performed for approx. 0.1 seconds as to whether voltage uT is still too high; if so, the system again switches off and a new startup attempt is made after about six seconds. If fuse 240 is inadvertently triggered by interference, the result is to prevent the shutoff from being permanent.

The same reference characters are used for identical or identically functioning parts in FIG. 10 as in FIG. 2, and those parts are not described again.

Node 114 is connected to the cathode of a Zener diode 250 whose anode is connected via a resistor 252 to a node 254. The latter is connected to the cathode of a Zener diode 256 whose anode attaches to negative line 16. Node 254 is connected via a resistor 258 to the base of an npn transistor 260 whose emitter is connected to negative line 16 and whose collector is connected to the base of an npn transistor 262 and, via a resistor 264, to +12 V (Vss).

The collector of transistor 262 is connected to negative input 268 of an operational amplifier (OA) 266 that is also connected to the regulated voltage Vss of e.g. +12 V. Its positive input 270 is connected via a resistor 272 to +12 V and via a resistor 274 to negative line 16. A capacitor 276 is located between negative input 268 and negative line 16. Output 278 of OA 266 is connected via a resistor 280 to positive input 270 and via a resistor 282 to negative input 268, and also to the anode of a diode 284 whose cathode is connected via a resistor 286 to input 268.

Output 278 is connected via a resistor 288 to the base of an npn transistor 290 whose emitter, like the emitter of an npn transistor 292, is connected to negative line 16. The collector of transistor 290 is connected directly to the base of transistor 292 and, via a resistor 294, to +12 V. The collector of transistor 292 is connected to node 32; i.e. when transistor 292 is conductive, node 32 receives a very low potential, thus causing current regulator 30 to be blocked.

Manner of Operation of FIG. 10

The reader is referred to the description of FIG. 2 regarding the manner of operation of current regulator 30, link circuit regulator 34, and overvoltage protector 38.

Fuse 240 with Automatic Reset

If voltage uT rises above a value determined by Zener diodes 250, 256, transistor 260 is switched on, causing transistor 262 to switch off. The latter had previously been discharging capacitor 276, and capacitor 276 therefore now charges via diode 284 and resistor 286, since the output of OA 266 is high.

When the voltage at capacitor 276 reaches the threshold voltage at positive input 270, output 278 switches to low, thereby reducing said threshold voltage. Capacitor 276 is now discharged through high-resistance resistor 282 until the voltage at capacitor 276 has dropped below the (reduced) threshold voltage at positive input 270.

During charging of capacitor 276, the left terminal of resistor 280 is at +12 V; this raises the threshold voltage at positive input 270.

During discharging of capacitor 276, the left input of resistor 280 is at approx. 0 V, so that resistor 280 is connected in parallel with resistor 274 and the threshold voltage at positive input 270 consequently decreases. This implements a switching hysteresis.

When output 278 of OA 266 is low, transistor 290 is switched off and transistor 292 switched on. Because transistor 292 is switched on, target value u32 of current regulator 30 at node 32 goes to zero, and MOSFET 24 is consequently switched off.

This shutoff thus occurs after a short delay due to the charging of capacitor 276, e.g. after 100 ms.

After capacitor 276 has discharged through resistor 282, output 278 once again becomes high, transistor 290 is conductive, and transistor 292 is blocked, so that current regulator 30 is activated again. If current i is still too high, MOSFET 24 is again switched off after about 100 ms in the manner already described. If current i is once again normal after switching on, current regulator 30 remains switched on, because in that case Zener diodes 250, 256 are once again blocked, so that transistor 260 is blocked, transistor 262 is conductive, and capacitor 276 discharges.

FIG. 11 shows an oscillogram for the case in which, in the context of FIG. 10, terminals 18 and 20 are short-circuited. MOSFET 24 is briefly switched on every six seconds, so that a current i flows in it for 0.1 second. Voltage uG at the gate of MOSFET 24 is depicted at the bottom of FIG. 11. It becomes high only briefly at switch-on if a short circuit still exists between 18 and 20.

Preferred Values for Components of Electronic Fuse 240

| | |
|---|---|
| Zener diode 250 | BZX284C6V2 |
| Zener diode 252 | BZX284C3V9 |
| Resistor 252 | 33 kOhms |
| Resistor 258 | 1 kOhm |
| Transistors 260, 262, 290, 292 | BC846B |
| Resistors 264, 274, 288, 294 | 22 kOhms |
| Resistor 272 | 330 kOhms |
| Capacitor 276 | 3.3 uF |
| Resistor 286 | 100 kOhms |
| Diode 284 | BAS216 |
| Resistor 282 | 820 kOhms |
| OA 266 | LM29020 |
| Resistor 280 | 43 kOhms |

FIG. 12 shows a variant of FIG. 2 or 10. Only the right-hand part of these two Figures is therefore depicted.

In FIG. 12, a Zener diode 300 is connected in parallel with MOSFET 24. In such a case a load 302, e.g. a fan, should be connected to terminals 18, 20 via a blowout fuse 304. Alternatively, said blowout fuse can be arranged e.g. at a point 306 in supply line 14.

If a DC voltage of 48 V is present between lines 14 and 16, Zener diode 300 can be designed, for example, for 28 V, i.e. for approximately half the operating voltage.

In terms of defects in MOSFET 24, a distinction must be made between two cases:

a) A short circuit in MOSFET 24. In this case fan 302 continues to function but without current regulation.
b) MOSFET 24 is nonconductive. In this case fan 302 would be immobilized, and the device in question would no longer be cooled.

In this situation, Zener diode 300 becomes conductive and continues to supply fan 302 with (reduced) power. Assuming a DC voltage of 48 V and a Zener diode of 28 V, fan 302 receives a reduced voltage of 20 V, so that it continues to run but at reduced speed. Zener diode 300 must be selected for the appropriate output, and usually requires a heat sink.

Since electronic fuse 40 or 240 is no longer effective in this case, the additional blowout fuse 304 is provided in series with fan 302. If the blowout fuse is arranged at point 306, it then provides general protection against a short circuit between points 18 and 20.

The arrangement with a Zener diode can, of course, also be used in the context of FIG. 7. In this case the Zener diode is arranged between points 151 and 149. This variant is not explicitly depicted.

Many variants and modifications are of course possible in the context of the present invention. Certain additional functions that have been described in connection with the exemplary embodiments could be omitted if applicable, for example the overvoltage protection or electronic fuse, if the customer does not want them. Alternatively, further additional functions are also possible if the customer does want them, e.g. an acoustic or visual alarm in the event of overcurrent or upon activation of the fuse function.

What is claimed is:

1. An arrangement for powering a DC motor (12) from a DC power supply, comprising
    a DC link circuit (14, 22; 16, 141) adapted to be coupled to said DC motor and having a capacitor (21) associated therewith, adapted to temporarily supply energy to said DC motor;
    a first regulator (30; 146) for connecting the DC link circuit to the DC power supply, which feeds a substantially constant current (i) via a transistor (24), serving as a linear adjusting element, to said capacitor (21) and to the DC motor;
    wherein a voltage drop ($U_T$) arises at said transistor (24); and further comprising
    a second regulator (34; 144) which supplies a target value (U32, U188) to an input of said first regulator (30; 146), said second regulator having an input adapted to be supplied with an actual voltage value derived from a voltage (UZK) across said DC motor, whereby said second regulator (34; 144) adapts said target value (U32, U188) for said first regulator to varying loads of the DC motor (12) and thereby minimizes audio-frequency electrical fluctuations at supply leads (14, 16) of said motor and minimizes resulting electromagnetic noise.

2. The arrangement according to claim 1, wherein
    said actual voltage value applied to said input of said second regulator is substantially proportional to the voltage drop ($U_T$) across said transistor (24) serving as said linear adjusting element.

3. The arrangement according to claim 2, wherein said voltage drop ($U_T$) at said transistor (24) corresponds essentially to an AC voltage component of the voltage at said DC link circuit (10, 22; 16, 141).

4. The arrangement according to claim 1, wherein
    said target value (U32, U188) for the first regulator (30, 146) is limited to a maximum value.

5. The arrangement according to claim 1, wherein
    the second regulator (34, 144) is configured a a proportional regulator with a first-order timing member.

6. The arrangement according to claim 5, wherein
    the second regulator (34, 144) has a larger time constant (T1) than the first regulator (30; 146), causing said second regulator to react more gradually to change in its input signal than does said first regulator.

7. The arrangement according to claim 1, wherein said transistor (24) serving as a linear adjusting element is a MOSFET transistor.

8. The arrangement according to claim 7, wherein
    the voltage drop ($U_T$) at said MOSFET transistor (24; 150) affects, via the second regulator (34; 144), the target value (U32, U188) applied to said first regulator.

9. The arrangement according to claim 7, wherein the voltage drop ($U_T$) at said MOSFET transistor (24; 150) corresponds essentially to an AC voltage component of the voltage (UZK) at the DC link circuit (14, 22; 16, 141).

10. The arrangement according to claim 1,
    further comprising a circuit (38) which is responsive to a voltage level of said DC power supply and which, in the event of an overvoltage condition, reduces the current through said first regulator (30, 146).

11. The arrangement according to claim 1,
    further comprising an electronic fuse (40), responsive to a voltage at an adjusting element (24) of the first regulator (30, 146), and causing a shutoff when said voltage at said adjusting element exceeds a predetermined value.

12. The arrangement according to claim 11, wherein said electronic fuse (240) has an associated reset means (260, 262, 276, 282, 284, 286) for reactivating the first regulator (30) after lapse of a predetermined time interval since shutoff.

13. The arrangement according to claim 1, further comprising a time delay circuit (175) which, for a predetermined period after turn-on of the arrangement, deactivates the first regulator (30, 146).

14. The arrangement according to claim 1, further comprising a Zener diode (300) connected in parallel to the transistor (24) of the first regulator (30, 146), wherein, if a defect causes said transistor (24) to remain non-conductive for more than a predetermined time interval, said Zener diode becomes conductive, in order to take over as supplier of current to a DC motor (302) connected to said arrangement.

15. The arrangement according to claim 1, wherein said DC motor is an electronically commutated motor.

16. The arrangement according to claim 1,
wherein two conductors (14, 16) connect to said DC power supply, and one of said conductors also serves for signal transmission to or from said connected DC motor (44).

17. The arrangement according to claim 1, further comprising an additional regulator (52) connected to said DC motor for controlling an operating value thereof.

18. An arrangement for powering a DC motor (12) from a DC power supply, comprising
a DC link circuit (14, 22; 16, 141) adapted to be coupled to said DC motor and having a capacitor (21) associated therewith, adapted to temporarily supply energy to said DC motor;
a first regulator (30; 146) for connecting the DC link circuit to the DC power supply, which feeds a substantially constant current (i) via a transistor (24), serving as a linear adjusting element, to said capacitor (21) associated with said DC link circuit and to the DC motor, generating a voltage drop ($U_T$) at said transistor (24); and further comprising
a second regulator (34; 144) which supplies a target value (U32, U188) to an input of said first regulator (30, 146), said second regulator having a voltage (22), supplied as an actual value to an input of said second regualtor, said voltage being substantially proportional to the voltage drop ($U_T$) at said transistor (24) serving as said linear adjusting element, the second regulator (34; 144) serving to adapt said target value (U32, U188) for said first regulator to varying loads of the DC motor (12) and thereby to minimize audio-frequency electrical fluctuations at supply leads (14, 16) of said motor and to minimize resulting electromagnetic noise.

19. The arrangement according to claim 18, wherein said voltage drop ($U_T$) at said transistor (24) corresponds essentially to an AC voltage component of the voltage at said DC link circuit (10, 22; 16, 141).

20. The arrangement according to claim 18, wherein
said target value (U32, U188) for the first regulator (30, 146) is limited to a maximum value.

21. The arrangement according to claim 18, wherein
the second regulator (34, 144) is configured as a proportional regulator with a first-order timing member.

22. The arrangement according to claim 21, wherein
the second regulator (34, 144) has a larger time constant (T1) than the first regulator (30; 146), causing said second regulator to react more gradually to change in its input signal than does said first regulator.

23. The arrangement according to claim 18, wherein said transistor (24) serving as a linear adjusting element is a MOSFET transistor.

24. The arrangement according to claim 23, wherein
the voltage drop ($U_T$) at said MOSFET transistor (24; 150) affects, via the second regulator (34; 144), the target value (U32, (U188) applied to said first regulator.

25. The arrangement according to claim 24, wherein the voltage drop ($U_T$) at said MOSFET transistor (24; 150) corresponds essentially to an AC voltage component of the voltage (UZK) at the DC link circuit (14, 22; 16, 141).

26. The arrangement according to claim 18,
further comprising a circuit (38) which is responsive to a voltage level of said DC power supply and which, in the event of an overvoltage condition, reduces the current through said first regulator (30, 146).

27. The arrangement according to claim 18,
further comprising an electronic fuse (40), responsive to a voltage at an adjusting element (24) of the first regulator (30, 146), and causing a shutoff when said voltage at said adjusting element exceeds a predetermined value.

28. The arrangement according to claim 27, wherein said electronic fuse (240) comprises an associated reset means (260, 262, 276, 282, 284, 286) for reactivating the first regulator (30) after lapse of a predetermined time interval since shutoff.

29. The arrangement according to claim 18, further comprising a time delay circuit (175) which, for a predetermined period after turn-on of the arrangement, deactivates the first regulator (30, 146).

30. The arrangement according to claim 18, further comprising a Zener diode (300) connected in parallel to the transistor (24) of the first regulator (30, 146), wherein, if a defect causes said transistor (24) to remain non-conductive for more than a predetermined time interval, said Zener diode becomes conductive, in order to take over as supplier of current to a DC motor (302) connected to said arrangement.

31. The arrangement according to claim 18, wherein said DC motor is an electronically commutated motor.

32. The arrangement according to claim 18, wherein two conductors (14, 16) connect to said DC power supply, and one of said conductors also serves for signal transmission to or from said connected DC motor (44).

33. The arrangement according to claim 18, further comprising an additional regulator (52) connected to said DC motor for controlling an operating value thereof.

* * * * *